Jan. 5, 1932.  J. W. LIVINGSTON  1,839,794
RAILWAY SWITCH LOCKING APPARATUS
Filed May 12, 1931
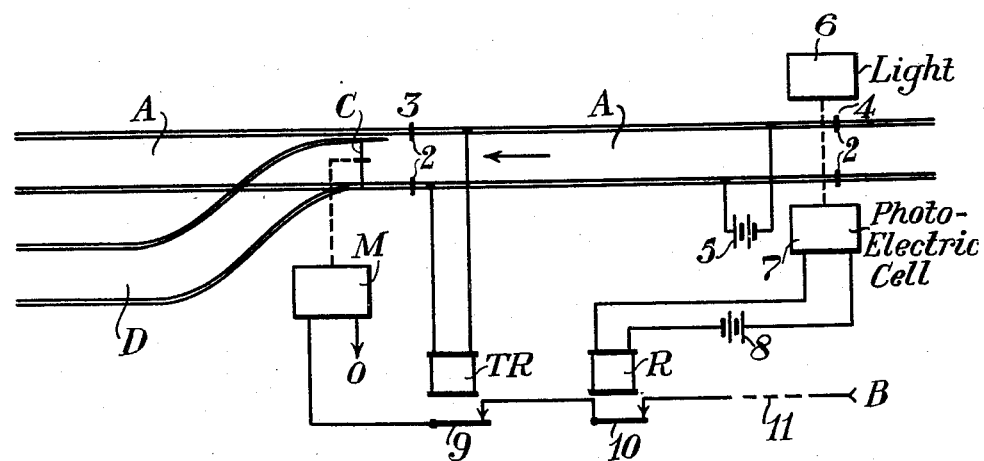
INVENTOR:
J. W. Livingston,
BY
His ATTORNEY.

Patented Jan. 5, 1932

1,839,794

UNITED STATES PATENT OFFICE

JOHN W. LIVINGSTON, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY SWITCH LOCKING APPARATUS

Application filed May 12, 1931. Serial No. 536,751.

My invention relates to railway switch locking apparatus, and particularly to apparatus for preventing a switch from being moved while a car is passing through the switch.

The present invention is especially suitable for use in connection with the switches in freight classification yards. The minimum spacing between cars which are being classified in such yards is determined to a large extent by the lengths of the switch detector track circuits, and the greater the spacing between cars, the slower is the operation of the yard. It is desirable, therefore, to keep the track circuits as short as possible.

The conventional freight car has a wheel base of 37 feet or less, and the spacing between the inner wheels of the two trucks of such cars is 27 feet or less. It follows that for conventional freight cars a track circuit 27 feet long will prevent the switch from being thrown between the trucks of the car. Special cars are, however, being built at the present time in which the spacing between the inner wheels of the two trucks is more than 27 feet. It follows that when these special cars pass over a 27-foot track circuit there will be an interval of time during which the car bridges the track circuit, and the result is that during such time interval the switch will not be locked.

One feature of my invention is the provision of means for preventing a switch from being unlocked when one of these special cars bridges the track circuit.

I will describe one form of apparatus embodying my invention, and will then point out the novel features thereof in claims.

The accompanying drawing is a diagrammatic view showing one form of apparatus embodying my invention.

Referring to the drawing, the reference character A designates a railway track along which traffic normally moves in the direction indicated by the arrow. This track is provided with a switch C leading into a branch track D. The rails of track A immediately in the rear of the switch C are divided by insulated joints 2 to form a track section 3—4, and this section is provided with the usual track circuit comprising a battery 5 and a track relay TR. Section 3—4 may, for example, be 27 feet in length.

Located adjacent the right-hand end of the section 3—4 are a source of light 6 and a photoelectric cell 7, which elements are in such relative positions that light from the source 6 normally strikes the cell 7, but is intercepted by the body of a car entering section 3—4. A second relay R is provided with a circuit including a battery 8, and this circuit is controlled by the photoelectric cell 7 in such manner that the relay is closed or opened according as the cell does or does not receive light from the source 6.

The switch C is operated by a mechanism M, and this mechanism is provided with a controlling circuit which includes a front contact 9 of track relay TR and a front contact 10 of relay R, as well as one or more other contacts represented by the dash line 11. The circuit for mechanism M is illustrated in purely diagrammatic fashion in the drawing, the essential factor being that the switch C cannot be moved unless both relay contacts 9 and 10 are closed.

When a conventional freight car enters the track section 3—4, it immediately opens track relay TR, and holds this relay open until the last wheels of the car leave the section. It follows that during the passage of a conventional car, the relay R performs no useful function. When a special car enters section 3—4, it opens track relay TR, and while this car spans the track section 3—4, the body of the car intercepts the light from the source 6, thereby preventing this light from reaching the photoelectric cell 7, so that relay R will be open. During the time that the car bridges the track section, track relay TR will close, but relay R being open, it is impossible to operate the switch C.

It follows that by means of apparatus embodying my invention it is impossible to throw the switch C during the passage of either a conventional freight car or a special car having a longer wheel base than the conventional car, and yet the locking appartus places no limitation on the spacing of the cars passing through the classification yard.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a stretch of track provided with a switch, said stretch being divided to form a track section adjacent the switch, a track circuit including a track relay for said section, a source of light and a photoelectric cell located adjacent the end of said section from which cars approach the switch and in such relative positions that light from the source normally strikes the cell but is intercepted when a car enters the section and continues to be intercepted until the rear truck of the car enters the section, a relay controlled by said cell and closed or opened according as the cell does or does not receive light from said source, and means for preventing said switch from being moved unless both of said relays are closed.

2. In combination, a stretch of track provided with a switch, a track section located adjacent said switch and provided with a track circuit, a source of light and a photoelectric cell located adjacent the end of said section from which cars approach the switch and in such relative positions that light from the source normally strikes the cell but is intercepted when a car enters the section and continues to be intercepted until the rear truck of the car enters the section, and means for preventing said switch from being moved unless said track section is unoccupied and said photoelectric cell is receiving light from said source.

In testimony whereof I affix my signature.

JOHN W. LIVINGSTON.